Feb. 5, 1952 C. A. STRAIT 2,584,512
CATERPILLAR ATTACHMENT FOR TRUCKS
Filed Aug. 13, 1948 2 SHEETS—SHEET 1

Inventor
Claude A. Strait
By Robert M. Dunning

Feb. 5, 1952        C. A. STRAIT        2,584,512
CATERPILLAR ATTACHMENT FOR TRUCKS
Filed Aug. 13, 1948        2 SHEETS—SHEET 2
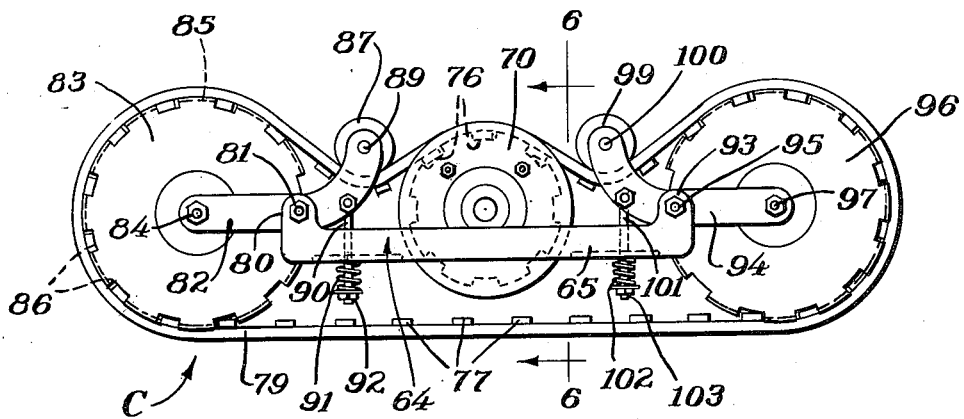
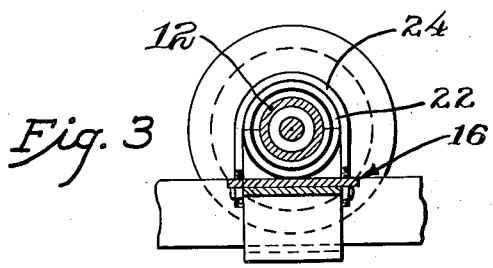
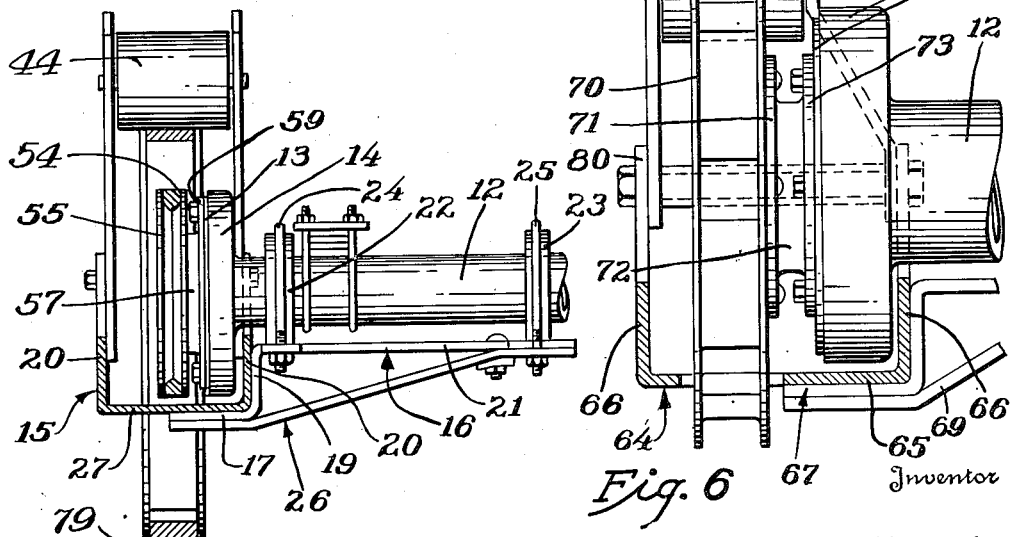
Claude A. Strait
By Robert M. Dunning Patented Feb. 5, 1952

2,584,512

UNITED STATES PATENT OFFICE 2,584,512

CATERPILLAR ATTACHMENT FOR TRUCKS

Claude A. Strait, St. Paul, Minn.

Application August 13, 1948, Serial No. 44,112

10 Claims. (Cl. 309—8)

My invention relates to an improvement in Caterpillar attachment for trucks wherein it is desired to provide a means of converting a truck of conventional design into a truck having endless traction belts.

When trucks are used in certain localities and for certain purposes it is desirable that they be provided with endless traction belts in place of drive wheels. Such traction belts provide greater traction by their greater area of contact with the ground and also provide a structure less likely to sink into the ground because of the large area in contact with the ground. On the other hand endless traction belts are disadvantageous for certain uses. The present invention resides in an attachment by means of which a truck having drive wheels of the conventional type may be changed into a truck having endless traction belts.

An object of the present invention resides in the provision of an attachment for a truck or the like which may be attached to the rear axle of the vehicle in place of the traction wheels and which may be driven by the rear vehicle axle. The device includes a pair of spaced wheels or rollers having an endless traction belt supported thereon. The connection between the driving axle and the traction belt is such as to reduce the speed of the vehicle and increase the power. As a result the truck may be used for slow speed work such as pulling farm implements and the like.

A feature of the present invention resides in the provision of a novel means for driving the traction belt from the supporting wheels or rollers. The endless belt is provided with spaced lugs on its outer surface throughout its entire length. The wheels or rollers are provided with angularly spaced notches into which these lugs successively engage. Thus the belt is positively driven by the supporting wheels.

A feature of the present invention lies in the provision of a novel means of holding the belt taut between the supporting wheels. One of the wheels is supported on a pivoted cradle. The wheel is mounted at one end of the cradle and a belt engaging roller is supported on the other end thereof. The cradle is pivoted intermediate its ends to the wheel supported frame. The weight of the vehicle tends to pivot the cradle in a manner to urge the roller against the belt between the supporting wheels. Thus the roller holds the belt taut by the weight of the vehicle.

These and other objects and novel features of my invention will be more clearly and fully set forth in the following specification and claims.

In the drawings forming a part of my invention.

Figure 3 is a sectional view through a portion of my device showing the manner in which the device may be mounted.

Figure 4 is an elevation view of a portion of my device.

Figure 5 is a side elevational view of a modified form of attachment.

Figure 6 is a sectional view through a portion of the structure of Figure 5, the position of the section being indicated by the line 6—6 of Figure 5.

Figures 1, 2:
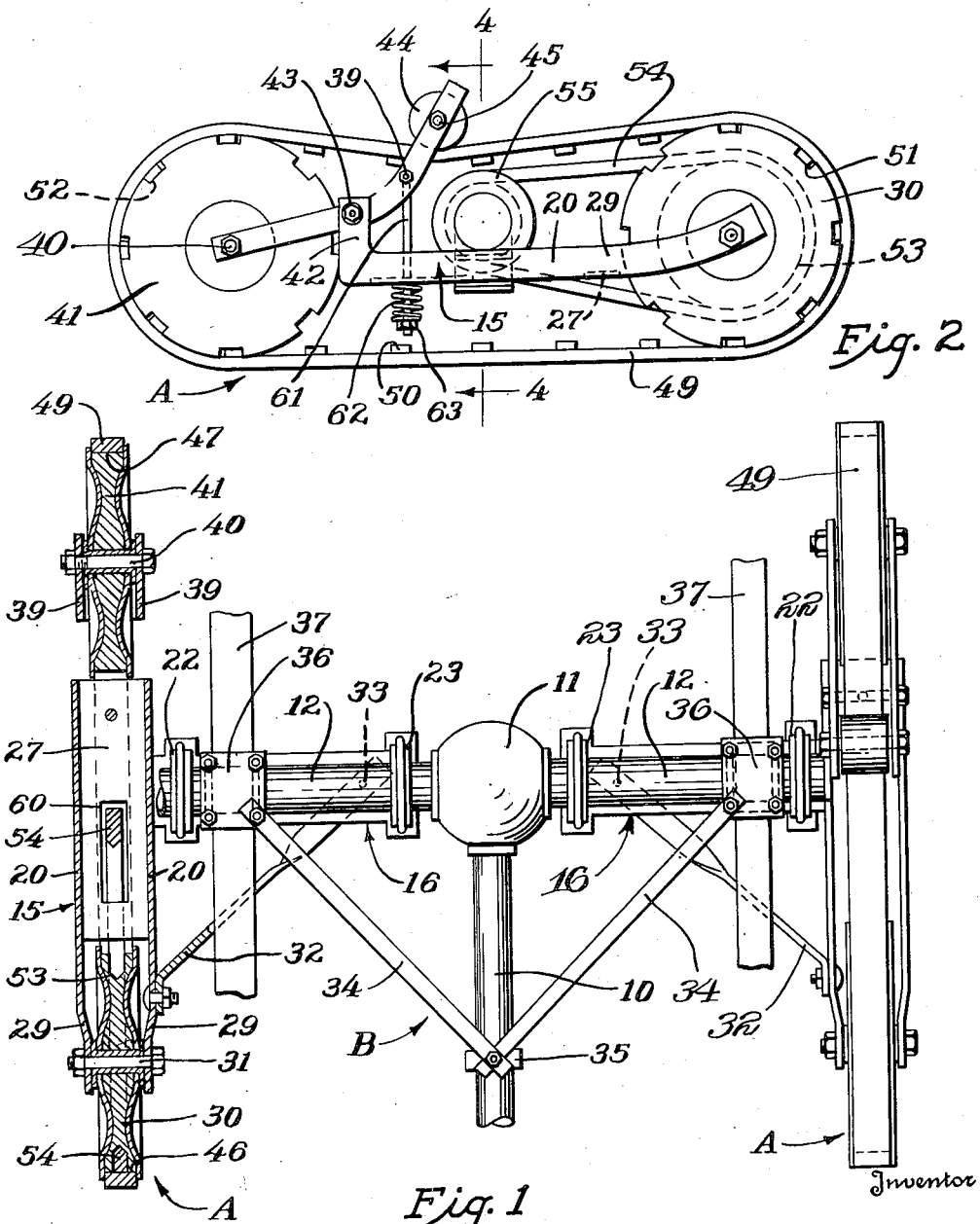
Figure 1 is a diagrammatic top plan view of a truck axle showing the manner in which the attachments are secured thereto.
Figure 2 is a side elevational view of one of the attachments.

The Caterpillar attachments A are designed for attachment with a truck B of any conventional type, only a portion of the truck being illustrated for the purpose of simplicity. As shown in Figure 1 of the drawings the truck B includes a propeller or drive shaft 10 which extends from the truck engine to the differential housing within the housing 11. A pair of aligned end opposed axle housings 12 extend laterally from the differential housing 11 to enclose the wheel axles. The wheel axles are usually provided at their outer extremities with flanges such as 13 to which the vehicle wheels are connected. As the specific arrangement of the axles is not important in the present invention no attempt has been made to illustrate the construction in detail. A brake drum housing 14 is usually attached to the axle housings 12 to enclose brake mechanism cooperable with a brake drum secured for rotation with the flange 13.

As the Caterpillar attachments A are identical in form, with the exception of the fact that they are designed for mounting on opposite wheels, but one of these structures will be described in detail. As indicated in Figures 1, 2, and 4 of the drawings a longitudinally extending channel bracket 15 forms a support for the structure. As shown in Figure 4 of the drawings a supporting strap 16 has an end 17 which is anchored to the base of the channel shaped support 15. An adjacent portion of the strap 16 extends upwardly as indicated at 19 to extend along one wall 20 of the channel bracket 15. The strap 16 then extends horizontally as indicated at 21 and lies parallel to and beneath the axle housing 12.

A pair of bearings 22 and 23 are secured to the axle housing 12 to encircle the same in axially spaced relation. A U-shaped bolt 24 extends over the bearing 22 and into the strap 16 to hold the strap secured to the axle housing. A similar U-bolt 25 encircles the bearing 23 and is anchored to the strap 16 for a similar purpose. The bearings 22 and 23 permit rotation of the strap 21 about the axis of the axle housing 12, the U bolts 24 and 25 encircling the outer rotatable portions of the bearings while the inner portions of these bearings are anchored to the axle housing.

A brace 26 is anchored at one end to the end 17 of the strap 16 or to the base 27 of the channel bracket 15. The other end of this brace 26 is anchored to the free end 21 of the strap 16 so as to act as a further brace for the channel brackets 15. As best illustrated in Figures 1 and 2 of the drawings the side walls 20 of the channel bracket 15 are extended to form spaced arms 29 for supporting the wheel 30. A pivot 31 extends through the arms 29 and through the axis of the wheel 30 to pivotally connect these elements. Suitable bearings are provided for allowing free rotation of the wheel 30 about its axis, these bearings being of any desired type.

A brace 32 is connected to the innermost arm 29 of the channel bracket 15 and is anchored at 33 to the strap 16 and the brace 26 to act as a means of holding the channel bracket 15 at right angles to the axis of the axle housing 12. Braces such as 34 may also be connected between a collar 35 on the propeller shaft for the attachment plate 36 between the vehicle spring 37 and the axle housing. These braces 34 merely tend to strengthen the structure.

A pair of curved arms 39 are connected by a pivot 40 which acts as an axis for a wheel 41. Suitable bearings may be provided between the pivot 40 and the wheel to freely support the wheel. The side walls 20 of the channel bracket 15 are provided with upwardly extending ends 42 for accommodating a pivot bolt or pin 43 extending through the spaced arms 39. A roller 44 is pivotally mounted on a suitable pivot 45 extending through the arms 39. The arms 39 are pivotal in unison about the pivot 43 for a purpose which will be later described in detail.

The wheel 30 is provided with a peripheral groove 46 and the wheel 41 is provided with a similar peripheral groove 47. An endless traction belt 49 is supported in the grooves 46 and 47, the wheels acting in the manner of pulleys to support the traction belt. Regularly spaced lugs 50 project inwardly from the inner surface of the belt 49. Suitable angularly spaced pockets 51 are provided in the wheel 30 at the base of the groove 46 and similar pockets 52 are provided extending inwardly from the base of the groove 47 of the wheel 41. The lugs 50 are properly spaced to engage in the pockets 52 and thus cause rotation of the wheels and connecting belt in unison.

A pulley groove 53 is provided in the wheel 30 for accommodating a V-belt 54 inwardly of the belt 49. A pulley 55 is connected to the flange 13 mounted for rotation with the rear axle. A belt 54 connects the pulley 55 to the wheel 30 so that rotation of the rear axle rotates the wheel 30. Rotation of the wheel 30 acts through the belt 49 to rotate the other wheel 41. While the element 54 has been described as a belt and the element 55 has been described as a pulley, obviously other driving means such as noiseless chains or other such means may be substituted therefor in actual construction so as to provide a positive driving connection between the rear axle and the drive wheel 30.

As illustrated in Figure 4 of the drawings the pulley 55 is connected by a hub or sleeve 57 to an attachment disc or ring 59 which is bolted to the flange 13 connected to the wheel axle. As shown in Figures 1 and 2 of the drawings, an aperture 60 may be provided in the channel base 27 through which the belt 54 may extend.

A rod 61 is pivotally connected between the arms 39 and extends through the channel base 27. A spring 62 is interposed between the channel base 27 and a nut 63 on the rod 61. This rod 61 acts as a limiting means to limit the pivotal movement of the arms 39 about the fixed pivot 43. As illustrated in Figure 2 of the drawings the roller 44 rides upon the outer surface of the belt 49 and acts as an idle roller to hold the belt 49 tight. The weight of the truck upon the axle tends to exert a downward force upon the arms 39 moving the roller 44 against the belt with considerable pressure and holding the belt taut. At the same time, however, the belt may flex between the wheels 30 and 41 an amount sufficient to obtain the necessary traction on uneven ground. In other words, a mound or raise in the surface of the ground may bow the traction belt 49 upwardly between the wheels 30 and 41 in the movement of the device over the surface of the ground rather than to provide a flat bearing surface which is unflexible and unyielding between the two wheels. The movement limiting rod 61 only operates in the event there is a tendency for the structure to buckle between its ends.

It will se seen that as the truck travels over the ground the longitudinal axis of the attachment may change, depending upon the contour of the surface over which the truck is travelling. In other words, the front wheel may raise or lower relative to the rear wheel. The structure pivots about the axis of the axle housing. At the same time the unsupported portion of the traction belt between the wheels allows the belt to intimately contact the surface over which the attachment passes.

In Figures 5 and 6 of the drawings I disclose an attachment C, which is similar in many respects to the structure previously described. In the attachment C, an elongated channel shaped bracket 64 is provided which has a base 65 and a pair of parallel walls 66. An attaching strap 67 is secured to the base 65, extends upwardly along one channel wall 66 and extends beneath the axle housing 12. The bracket 67 is similar to the strap 16 previously described and is attached to the axle housing in a similar manner. A brace 69, identical to the brace 26 is also provided as a further reinforcement to the structure. In other words, the channel bracket 64 is pivotal about the axis of the axle housing 12 in the same manner as was previously described in conjunction with the brackets 15.

A pulley or sprocket 70 is bolted or otherwise secured to the flange 71 of a connecting sleeve 72 having a spaced flange 73 attached to the driven flange 74 on the wheel axle. Thus the pulley or sprocket 70 rotates with the wheel axle and is driven thereby. A peripheral groove 75 is provided in the pulley and angularly spaced pockets 76 are also provided in the pulley at the base of the groove 75. The pockets 76 are properly spaced to accommodate the equally spaced lugs 77 projecting inwardly from the endless traction belt 79.

A pair of ears 80 extend upwardly from the side walls 66 of the channel bracket 64 to accommodate a pivot 81 for supporting a pair of spaced arms 82. A wheel 83 is mounted upon a suitable pivot 84 extending through the corresponding ends of the arms 82. The wheel 83 is peripherally grooved as indicated at 85 to accommodate the traction belt 79 and the wheel is provided with angularly spaced pockets 86 for accommodating the spaced lugs 77 on this belt. A roller 87 is supported by a pivot 89 extending through the opposite ends of the arms 82. The roller 87 is engageable with the outer surface of the belt 79. The rod 90 is pivotally connected between the arms 82 and extends through the base 65 of the channel bracket 64. A spring 91 encircles the end of the rod 90 and is interposed between the channel base 65 and a nut 92 on the end of the rod. This rod 90 acts as a snubbing means for limiting the rotation of the arms 82 about the fixed pivot 81.

A second pair of opposed ears 93 are provided at the opposite end of the channel bracket 64 forming extensions of the side walls 66 thereof. A pair of spaced parallel arms 94 are pivotally connected between the arms 93 by means of a pivot 95. A wheel 96 is pivotally supported by a suitable pivot axle 97 supported by corresponding ends of the arms 94. A roller 99 is pivotally supported by a pivot 100 extending through the other ends of the arms 94. The roller 99 engages the outer surface of the traction belt 79 as indicated in Figure 5 of the drawings.

A rod 101 is pivotally connected to the arms 94 and extends through the base 65 of the channel bracket 64. A spring 102 is interposed between the channel base 65 and a nut 103 on the rod 101. This rod 101 acts as a snubbing means for limiting rotation of the arms 94 about their fixed axis 95.

The operation of my device is believed obvious from the foregoing description. The weight of the truck bears downwardly upon the rear axle housing and this weight is transmitted through the brackets 67 and 69 to the channel bracket 64. A downward force is accordingly exerted upon the center portions of the lever arms 82 and 94. The wheels 83 and 96 support the weight of the truck and cause a force urging the rollers 87 and 99 against the outer surface of the traction belt. These rollers thus act as idle rollers to hold the traction belt taut about the wheels 83 and 96 and still provide a yielding support for the belt so that it may travel over the uneven surface of the ground between the wheels.

Rotation of the truck axles causes rotation of the pulley or sprocket 70 which in turn drives the belt 79. The belt is held in engagement with the pulley 70 by the rollers 87 and 99. Rotation of the belt causes a corresponding rotation of the supporting wheels 83 and 96.

It will be seen that my device may be quickly and easily attached to a truck in place of the usual wheels thereof. In attaching the structure it is only necessary to hold the axle housing elevated and remove the rear wheels on the bolting, connecting flanges of the pulley 55 or 70 thereto in place of the wheel. The braces supporting the channel brackets are attached to the axle housing in the manner described and additional braces may be provided if desired. The bearings 22 and 23 may be of a split type so that they may be applied to the surface of the axle housing without difficulty.

In accordance with the patent statutes, I have described the principles of construction and operation of my Catepillar attachment, and while I have endeavored to set forth the best embodiments thereof, I desire to have it understood that obvious changes may be made within the scope of the following claims without departing from the spirit of my invention.

I claim:

1. A Caterpillar attachment for trucks having a driving axle and a housing therefor, the attachment including a bracket rotatably supported by the axle housing for rotation about the axis thereof, a wheel, means including a pivot connecting said wheel to said bracket, a second wheel in tandem arrangement with the first named wheel, lever arm means pivotally connected to said bracket for pivotally supporting said second wheel, a traction belt connecting said wheels, and a roller supported by said lever arm means and engageable against the belt for tightening the same.

2. The structure described in claim 1 and including means connected to said axle for driving the belt.

3. The structure described in claim 1 and including snubbing means for limiting pivotal movement of said arm means in one direction.

4. The structure described in claim 1 and including laterally extending brace means forming the connection between said bracket means and said axle housing.

5. A Caterpillar attachment for a truck having a driving axle and an axle housing, the attachment including a bracket pivotally secured to the axle housing for axial rotation with respect thereto, a wheel pivotally secured to said bracket in fixed relation thereto, lever arm means pivotally connected to said bracket, a second wheel in tandem arrangement with the first named wheel and pivotally supported by said lever arm means, a roller pivotally supported by said lever arm means, a belt connecting said wheels, said roller engaging said belt between said wheels to tighten the same, and means connecting the truck axle with one of said wheels to rotate the same.

6. The structure described in claim 5 in which the one wheel connected to the axle comprises the wheel pivoted in fixed relation to the bracket.

7. A Caterpillar attachment for a truck having a driving axle and an axle housing therefor, the attachment including a drive wheel connected to the truck axle for actuation thereby, a bracket secured to the axle housing for rotation axially with respect thereto, a pair of wheels arranged in tandem relation, lever arm means pivotally connected to opposite ends of said bracket for pivotally supporting said wheels, a traction belt encircling said wheels and partially encircling said drive wheel, and roller means on said lever arms engageable with said belt for holding the same taut.

8. The structure described in claim 7 in which the rollers engage the belt on opposite sides of the drive wheels.

9. A traction drive mechanism of the Caterpillar type comprising a pair of wheels supported for rotation in tandem arrangement, continuous traction means embracing said wheels, lever arm means mounting one of said wheels for pivotal movement with respect to the other, and a member carried by said lever arm means engageable with the traction means for tightening the same.

10. A traction drive mechanism of the Caterpillar type comprising a bracket, a wheel pivotally supported by the bracket, a second wheel in tandem arrangement with the first named wheel, lever arm means pivotally connected to said bracket for pivotally supporting said second wheel, a traction belt connecting said wheels, and a roller supported by said lever arm means and engageable against the belt for tightening the same.

CLAUDE A. STRAIT.

REFERENCES CITED

The following references are of record in the file of this patent:

UNITED STATES PATENTS

| Number | Name | Date |
|---|---|---|
| 1,279,619 | Walker | Sept. 24, 1918 |
| 1,638,329 | Fennel | Aug. 9, 1927 |
| 1,683,407 | Penn | Sept. 4, 1928 |
| 1,831,012 | Kornbeck | Nov. 10, 1931 |
| 1,922,768 | Kegresse | Aug. 15, 1933 |
| 1,959,477 | Kegresse | May 22, 1934 |
| 1,980,276 | Kegresse | Nov. 13, 1934 |
| 2,467,947 | Skelton | Apr. 19, 1949 |

FOREIGN PATENTS

| Number | Country | Date |
|---|---|---|
| 244,836 | Great Britain | Dec. 28, 1925 |
| 332,416 | Germany | Jan. 29, 1921 |
| 372,752 | Germany | Apr. 3, 1923 |